(12) United States Patent
Lee

(10) Patent No.: US 8,907,663 B2
(45) Date of Patent: Dec. 9, 2014

(54) HEIGHT SENSOR MODULE FOR A VEHICLE WITH SEALING STRUCTURE

(75) Inventor: Suhyoung Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 222 days.

(21) Appl. No.: 13/472,187

(22) Filed: May 15, 2012

(65) Prior Publication Data

US 2013/0021028 A1    Jan. 24, 2013

(30) Foreign Application Priority Data

Jul. 20, 2011  (KR) .................. 10-2011-0071846

(51) Int. Cl.
  *G01B 7/30* (2006.01)
  *G01D 11/24* (2006.01)
(52) U.S. Cl.
  CPC .................. *G01D 11/245* (2013.01)
  USPC .................. 324/207.2; 324/207.25
(58) Field of Classification Search
  CPC .................. G01B 7/30; G01D 5/145
  USPC .......................... 324/207.2, 207.25
  See application file for complete search history.

(56) References Cited

U.S. PATENT DOCUMENTS

| | | | | |
|---|---|---|---|---|
| 4,966,041 A | * | 10/1990 | Miyazaki | ............ 73/862.191 |
| 5,544,000 A | * | 8/1996 | Suzuki et al. | ............ 361/139 |
| 6,756,780 B2 | * | 6/2004 | Hagio et al. | ............ 324/207.25 |
| 2005/0111197 A1 | | 5/2005 | Lee et al. | |
| 2005/0174132 A1 | | 8/2005 | Chang et al. | |
| 2006/0022531 A1 | * | 2/2006 | Tenca et al. | ............ 310/66 |
| 2007/0108967 A1 | * | 5/2007 | Okuya et al. | ............ 324/207.2 |
| 2011/0185812 A1 | * | 8/2011 | Raschke | ............ 73/431 |

FOREIGN PATENT DOCUMENTS

| | | |
|---|---|---|
| JP | 2001-183166 A | 7/2001 |
| JP | 2002-213960 A | 7/2002 |
| KR | 20-0440830 Y1 | 7/2008 |

OTHER PUBLICATIONS

Office Action dated Jul. 1, 2014 European Application No. 12168257.9.

* cited by examiner

*Primary Examiner* — Jay Patidar
(74) *Attorney, Agent, or Firm* — Saliwanchik, Lloyd & Eisenschenk

(57) ABSTRACT

A height sensor module is disclosed, the module including a sensor housing formed at an upper side with an opening; a shaft rotatably formed at the sensor housing; a magnet arranged at an upper side of the shaft; a PCB mounted at a surface opposite to the magnet with at least one magnetic element, and accommodated at an upper end of a plurality of support lugs protrusively formed at an interior of the sensor housing; a sensor cover closing the opening; a sealing member interposed between the sensor housing and the sensor cover to inhibit moisture and contaminant materials from entering the sensor housing; a plurality of elastic members interposed between the sensor cover and the PCB to push the PCB to a support lug side; and a support unit supporting both ends of the plurality of elastic members.

4 Claims, 4 Drawing Sheets

HEIGHT SENSOR MODULE FOR A VEHICLE WITH SEALING STRUCTURE

CROSS-REFERENCE TO RELATED APPLICATION

This application claims the benefit under 35 U.S.C. §119 of Korean Patent Application No. 10-2011-0071846, filed Jul. 20, 2011, which is hereby incorporated by reference in its entirety.

BACKGROUND

1. Field of Endeavor

The present disclosure relates to a height sensor module for vehicle.

2. Background

Generally, a vehicle is mounted with a variety of sensors, and recently, a height sensor is mounted at a vehicle for sensing a difference between a road surface and the vehicle so that a variety of controls can be performed in relation to a road surface state.

The height sensor is a sensor measuring a vehicle body height relative to a road surface, senses a relative position change (height change) between a vehicle body and a vehicle axle during travel of the vehicle, and provides the detected height information to an ECU (Electronic Control Unit) of suspension system capable of performing an electronic control. An ECS (Electronic Control Suspension System) protects the vehicle body by increasing a vehicle height at an unpaved rugged road using the information, and reducing the vehicle height at a high speed travelable road such as a highway, whereby travel and steering stability can be enhanced.

In most cases, the height sensor is installed at a position adjacent to a road surface on which the vehicle travels, and is therefore susceptible to contaminant materials such as dust and splashing water from the road surface, such that it is necessary to provide a sealing structure to a sensor cover for protecting the height sensor against infiltration of contaminant materials and moisture.

A conventional sealing structure is provided in such a manner that a sensor case and a sensor cover is coupled via a sealing member such as an O-ring, such that a gap is formed between the sensor cover and a PCB (Printed Circuit Board) mounted on the sensor case as much as height of the O-ring. In a case a gap is formed between the sensor cover and a PCB, and an external shock is applied to the PCB, a vibration is generated as much as the gap, and in a case the vibration is generated on the PCB, a Hall IC (Integrated Circuit) mounted on the PCB fails to output an accurate detection signal.

As a result, a support rib is formed at a surface opposite to the PCB of the sensor cover to inhibit the PCB from being vibrated or shaken by the external shock by applying a pressure to the PCB. However, the problem is that, in a case the PCB is applied with pressure by the support rib for a long time, the PCB may be destructed or cracked by fatigue resultant from the applied pressure to the PCB.

Furthermore, a sealing member such as the O-ring may change in elasticity in time due to deformed rubber ingredient to reduce a coupling strength between the sensor cover and the sensor case. Under this circumstance, the support rib cannot apply pressure to the PCB any longer, and the PCB may problematically shake or vibrate in response to the external shock.

BRIEF SUMMARY

The present disclosure has been made to solve the foregoing problems of the prior art and therefore an object of certain embodiments of the present invention is to provide a height sensor module for a vehicle configured to provide an improved structure capable of maintaining a sealing performance of a sealing member while inhibiting a PCB mounted with a Hall IC from being shaken or vibrated to thereby output an accurate detection signal at all times.

In one general aspect of the present disclosure, there is provided a height sensor module for a vehicle, comprising: a sensor housing formed at an upper side with an opening; a shaft rotatably formed at the sensor housing; a magnet arranged at an upper side of the shaft; a PCB mounted at a surface opposite to the magnet with at least one magnetic element, and accommodated at an upper end of a plurality of support lugs protrusively formed at an interior of the sensor housing; a sensor cover closing the opening; a sealing member interposed between the sensor housing and the sensor cover to inhibit moisture and contaminant materials from entering the sensor housing; a plurality of elastic members interposed between the sensor cover and the PCB to push the PCB to a support lug side; and a support unit supporting both ends of the plurality of elastic members.

Preferably, but not necessarily, the support unit includes a first boss protrusively formed at an upper side of the plurality of support lugs, a boss hole penetratively formed at a position corresponding to that of the first boss of the PCB, and a second boss protrusively formed at a surface opposite to the first boss of the sensor cover toward a direction facing the first boss.

Preferably, but not necessarily, the elastic member is provided in a pressure coil spring. Preferably, but not necessarily, the elastic member is a bellows spring of rubber material, both ends of which are coupled to the first and second bosses.

Preferably, but not necessarily, the magnetic element is a Hall IC.

The height sensor module for a vehicle according to the present disclosure is advantageous in that vibration or shake of a PCB is inhibited by a plurality of elastic members interposed between a sensor cover and the PCB, even if elasticity of a sealing member such as an O-ring interposed between a sensor case and the sensor cover, whereby even if the height sensor module is used for a long time, the module is not exposed to contaminant materials such as dust and dirty water and can output an accurate detection signal without any problem.

BRIEF DESCRIPTION OF THE DRAWINGS

The drawing figures depict one or more implementations in accord with the present concepts, by way of example only, not by way of limitations. In the figures, like reference numerals refer to the same or similar elements.

The accompanying drawings, which are included to provide a further understanding of the disclosure and are incorporated in and constitute a part of this application, also illustrate embodiment(s) of the disclosure, and together with the description serve to explain the principle of the disclosure. In the drawings.

DETAILED DESCRIPTION

Figure 1:
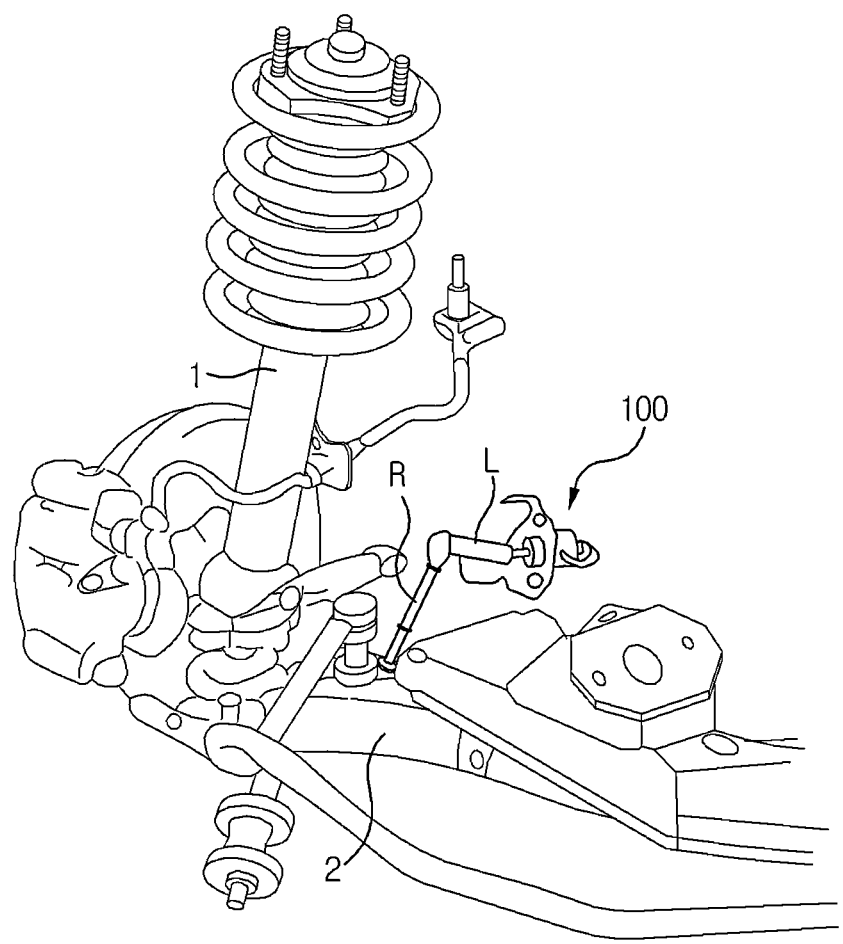
FIG. 1 is a schematic view illustrating a height sensor module mounted to a vehicle according to an exemplary embodiment of the present disclosure.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted.

Hereinafter, a height sensor module according to exemplary embodiments of the present disclosure will be described in detail with reference to the accompanying drawings.

Generally, a suspension device must be soft to provide an improved comfortable ride. However, in case of sudden acceleration, sudden braking and sudden turn, posture of a vehicle greatly changes despite comfortable ride. Alternatively, if the suspension device is hard, posture change of vehicle generated from various driving situations may be maximally restricted, but vibration from road surface cannot be absorbed to be directly transmitted to a driver, whereby the driver feels tired and uncomfortable. Thus, a mechanical suspension system must be adequately selected with a suspension characteristic most suitable to characteristics of a vehicle in consideration of running safety and ride comfort of the vehicle.

In order to solve the aforementioned problems, there is a need to variably control a damping force of the suspension system. The control of damping force can simultaneously obtain a ride comfort and running safety by softening the suspension system during a general drive and by hardening the suspension system during high speed drive and posture change.

In order to variably control the damping force of a suspension system, a vehicle body height must be variably changed in response to situation of road surface and driving conditions. That is, in case of driving on a rugged road such as unpaved road, the vehicle body height must be increased to protect a vehicle body, and in case of driving on a highway, the vehicle body must be decreased to reduce air resistance and to secure a running safety. The ECS (Electronic Control Suspension) is the very item developed for this control purpose, and commercialized in hydraulic pneumatic methods.

The present disclosure relates to a height sensor module indispensably mounted on the ECS. The ECS is operated in such a manner that a current vehicle height is detected and a measured value of the current vehicle height is transmitted to the ECS, where the ECS supplies a compressed air of storage tank to an air spring to increase the vehicle height if the value is lower than a target height, and discharges the compressed air in the air spring to the atmosphere to lower the vehicle height if the value is higher than a target height, whereby the vehicle height is always maintained at a predetermined height to independently control front wheels and rear wheels regardless of the number of passengers or load weight in the vehicle.

FIG. 1 is a schematic view illustrating a height sensor module mounted to a vehicle according to an exemplary embodiment of the present disclosure.

Referring to FIG. 1, a height sensor module 100 according to the present disclosure is mounted on a vehicle (not shown), a lever (L) and a rod (R) connected to the height sensor module 100 are respectively link-connected, and connected to an axial 2 side connected to a suspension system 1 of the vehicle to turn the rod (R) and the lever (L) in response to the road surface state, where a turn (rotation)value is detected by the height sensor module 100 to allow the ECS to calculate a vehicle height of the vehicle in response to a current road surface state.

The height sensor module 100 is frequently influenced by contaminants such as dust and water splashed from the road surface, such that the height sensor module 100 is assembled in a watertight structure to inhibit the height sensor module 100 from being infiltrated by the contaminants and water.

Figure 2:
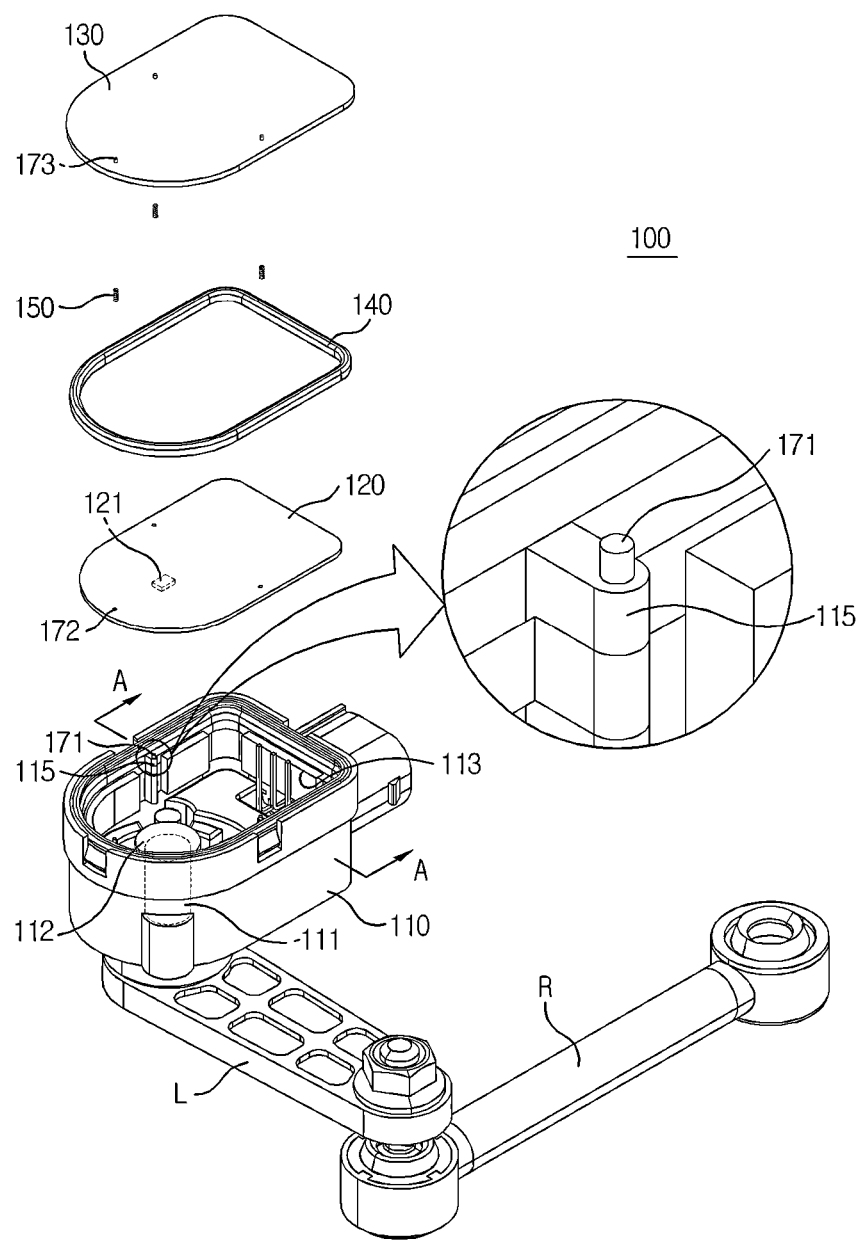
FIG. 2 is an exploded perspective view of the height sensor module of FIG. 1.
Figure 3:
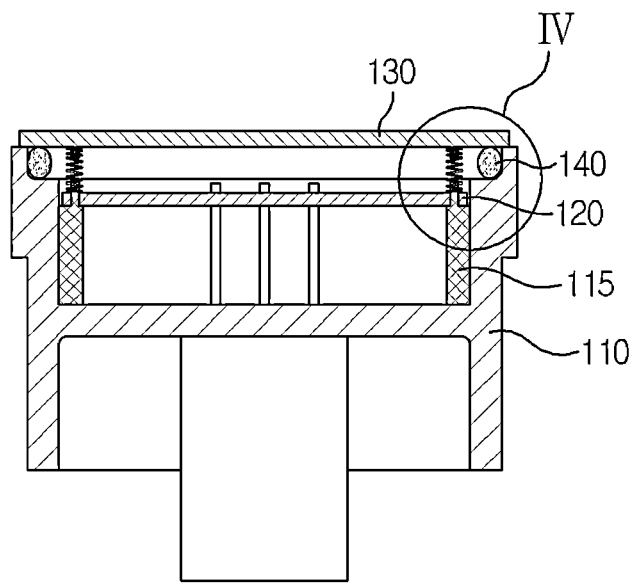
FIG. 3 is a cross-sectional view taken along line 'A-A'.

FIG. 2 is an exploded perspective view of the height sensor module of FIG. 1, and FIG. 3 is a cross-sectional view taken along line 'A-A'.

Referring to FIGS. 2 and 3, the height sensor module 100 includes a sensor case 110, a PCB 120, a sensor cover 130, a sealing member 140 and an elastic member 150, where the sensor case 110 and the sensor cover 130 are provided with a support unit 170 for supporting both ends of the elastic member 150.

The sensor case 110 takes a shape of an upper-opened cylinder, in which a shaft 111 is rotatably mounted. The shaft 111 is connected to the lever (L) and is rotated in association with the rotation of the lever (L). The shaft 111 is thereon mounted with a magnet 112 which is rotated in association with rotation of the shaft 111.

The sensor case 110 is mounted at a wall surface thereof with a terminal unit 113 connected to the ECS (not shown), and the terminal unit 113 is conductively and signal-exchangeably connected to the PCB 120. This connection may be possible by soldering or plug coupling by manufacturing a shape of a terminal unit corresponding thereto.

The sensor case 110 is formed at an inner surface with at least three support members 115, and the PCB 120 is mounted on an upper surface of the support member 115. The support member 115 is preferably formed on two surfaces opposite to the sensor case 110 and a surface opposite to the terminal unit 113, which means that the support member 115 is preferably formed on three surfaces as shown in FIG. 2.

The PCB 120 is arranged at an upper surface of the support member 115 and signal-exchangeably connected to the terminal unit 113. A surface opposite to the magnet 112 of the PCB 120 is mounted with at least one magnetic element 121, where the magnetic element 121 is preferably a Hall IC (Integrated Circuit).

The sensor cover 130 is provided in a shape corresponding to that of the opening and configured to cover an entire area of the opening of the sensor case 110. The sensor cover 130 is discretely installed at a predetermined space apart from the PCB 120.

The sealing member 140 is interposed between the sensor case 110 and the sensor cover 130 to inhibit water and contaminants from entering through a coupled area between the sensor case 110 and the sensor cover 130. The sealing member 140 is preferably provided with an O-ring of silicone material or rubber.

The elastic member is interposed between the PCB 120 and the sensor cover 130 and functions to apply pressure to the PCB 120 toward the support member 115. The elastic member is preferably provided with a bellows spring 160 of rubber material.

Figure 4:
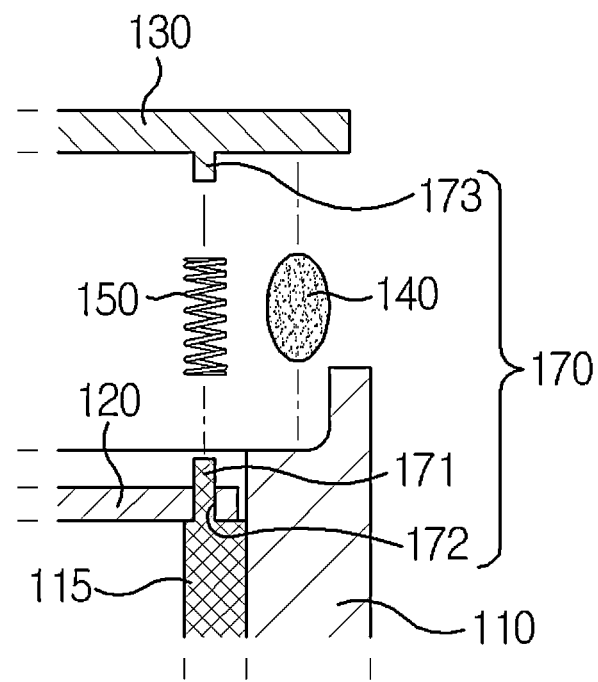
FIG. 4 is an enlarged view of essential parts of FIG. 3 according to a first exemplary embodiment of the present disclosure.

FIG. 4 is an enlarged view of essential parts of FIG. 3 according to a first exemplary embodiment of the present disclosure, where the coil spring 150 of elastic member is secured by the support unit 170.

The support unit 170 includes a first boss 171, a boss hole 172 and a second boss 173. The first boss 171 is protrusively formed at an upper side of the plurality of support lugs 115, the boss hole 172 is penetratively formed at a position corresponding to that of the first boss 171 of the PCB 120, and a second boss 173 is protrusively formed at a surface opposite to the first boss 171 of the sensor cover 130 toward a direction facing the first boss 171. The first and second bosses 171,173 support both ends of the coil spring 150 and inhibit the coil spring 150 from deviating.

Figure 5:
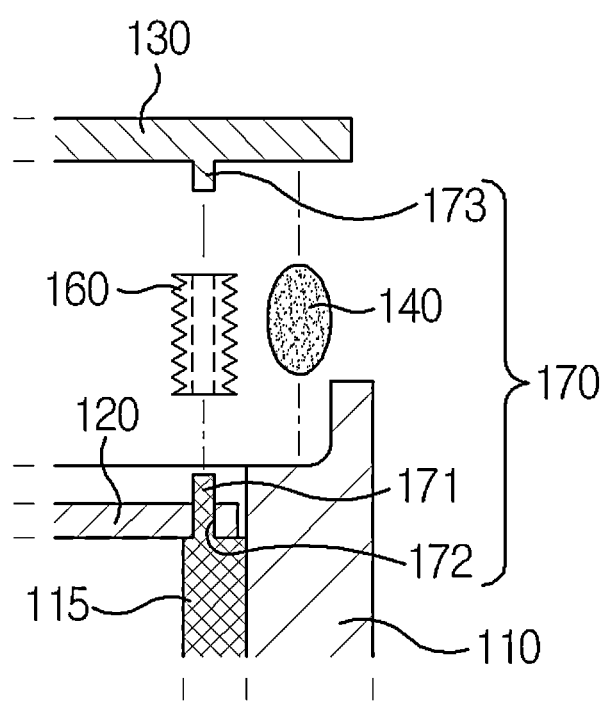
FIG. 5 is an enlarged view of essential parts of FIG. 3 according to a second exemplary embodiment of the present disclosure.

FIG. 5 is an enlarged view of essential parts of FIG. 3 according to a second exemplary embodiment of the present disclosure, where an elastic member using the bellows spring 160 is illustrated. The support unit 170 is structurally same as illustrated in FIG. 4. However, difference is that the elastic member is a bellows spring 160 made of rubber material.

As noted from the foregoing, the elastic member is provided with a coil spring 150 or a bellows spring 160 made of rubber material to allow the PCB 120 to be pushed toward the support member 115, whereby cracks or gaps are inhibited from occurring on the PCB 120 by excessive pressure, in a case a support rib of resin material is used to apply pressure as in the prior art.

Particularly, a force greater than a predetermined level generated by elastic restoring force is always applied to the PCB 120 to allow the PCB 120 to be secured at an originally mounted position without any vibration and shake, even if a gap is generated by a coupling between the sensor case 110 and the sensor cover 130 loosened by changed elasticity of the sealing member 140 such as an O-ring.

The height sensor module for vehicle according to the present disclosure has an industrial applicability in that vibration or shake of a PCB is inhibited by a plurality of elastic members interposed between a sensor cover and the PCB, even if elasticity of a sealing member such as an O-ring interposed between a sensor case and the sensor cover, whereby even if the height sensor module is used for a long time, the module is not exposed to contaminant materials such as dust and dirty water and can output an accurate detection signal without any problem.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A height sensor module for a vehicle with sealing structure, comprising:
    a sensor housing including an opening formed at an upper side of the sensor housing;
    a shaft rotatably arranged in the sensor housing;
    a magnet arranged at an upper side of the shaft;
    a Printed Circuit Board (PCB) mounted at a surface opposite to the magnet with at least one magnetic element, and accommodated at an upper end of a plurality of support lugs protrusively formed at an interior of the sensor housing;
    a sensor cover on the opening of the sensor housing;
    a sealing member interposed between the sensor housing and the sensor cover to inhibit moisture and contaminant materials from entering the sensor housing;
    a plurality of elastic members interposed between the sensor cover and the PCB to provide pressure on the PCB; and
    a support unit supporting both ends of the plurality of elastic members;
    wherein the support unit includes a first boss protrusively formed at an upper side of the plurality of support lugs, a boss hole penetratively formed on the PCB in a position corresponding to that of the first boss, and a second boss formed beneath the senor cover protruding toward the first boss;
    wherein the sealing member is formed as a closed loop; and
    wherein the first boss and the second boss are arranged inside the closed loop sealing member.

2. The height sensor module of claim 1, wherein the elastic member is provided in a pressure coil spring.

3. The height sensor module of claim 1, wherein the elastic member is a bellows spring of rubber material, both ends of which are coupled to the first and second bosses.

4. The height sensor module of claim 1, wherein the magnetic element is a Hall IC.

* * * * *